July 11, 1967  J. H. HALSTEAD  3,330,381
VEHICLE LIFT

Filed July 6, 1965  4 Sheets-Sheet 1

INVENTOR.
JOHN H. HALSTEAD
BY
Lothrop & West
ATTORNEYS

INVENTOR.
JOHN H. HALSTEAD
BY
Lothrop & West
ATTORNEYS

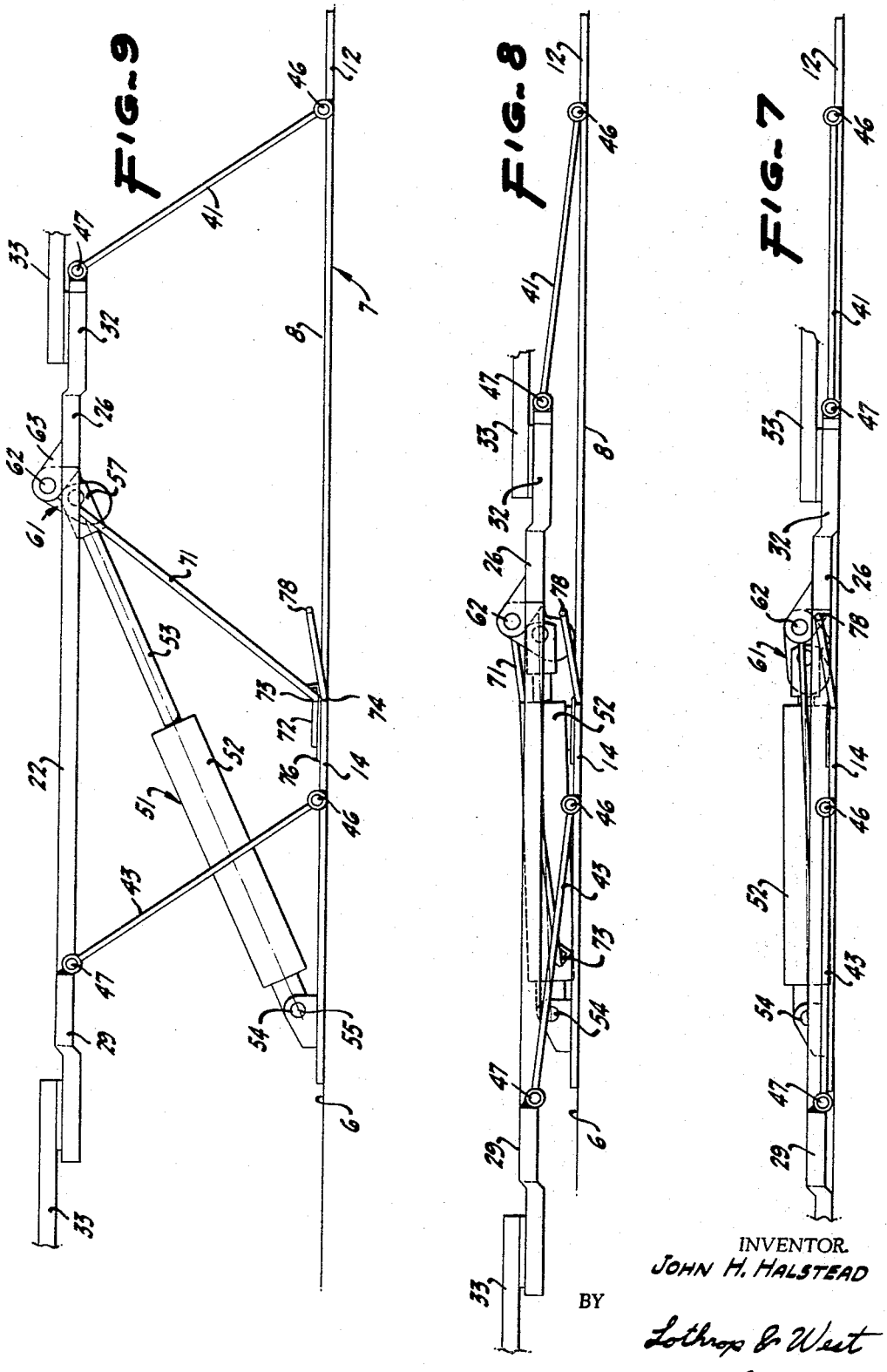

United States Patent Office 3,330,381
Patented July 11, 1967

3,330,381
VEHICLE LIFT
John H. Halstead, 1024 Emory St.,
San Jose, Calif. 95126
Filed July 6, 1965, Ser. No. 469,821
2 Claims. (Cl. 187—8.72)

ABSTRACT OF THE DISCLOSURE

A vehicle lift has a plurality of parallel links pivoted to a base and to a lift frame having means for engaging a vehicle. An expansible chamber mechanism pivoted to the base operates a cam lever to lift the lift frame through the lower part of the lifting movement, and an abutment for the cam lever produces a direct lift during the upper part of the lift frame motion.

My invention relates primarily to devices useful to lift a vehicle such as an automobile from its normal position resting on the ground or floor into an elevated position.

In providing vehicle lifts, it is customary to make an installation involving excavation below the normal ground or floor level and to install one or more vertical cylinder and plunger arrangements to effectuate the vehicle lifting operation. This is a satisfactory but relatively elaborate and expensive arrangement. There is a demand for a lift structure which can be installed without involving any excavation and which will be especially suitable for a range of light vehicles particularly when a moderate lifting movement is sufficient.

It is therefore an object of my invention to provide a vehicle lift which can be operated in virtually any environment without special preparation of the environment such as excavation, hole drilling and the like.

Another object of the invention is to provide a vehicle lift primarily designed to lift passenger cars and other relatively light vehicles through a satisfactory but limited distance.

Another object of the invention is to provide a vehicle lift which can readily be operated by a single expansible chamber mechanism, preferably a hydraulic ram or jack device.

Another object of the invention is to provide a vehicle lift in which the lift when in its lowered or receded position is very close to the floor and quite low so that a vehicle to be lifted can be driven over it without danger of interference with depending vehicle parts even though the available clearance is quite small.

Another object of the invention is to provide a vehicle lift in which the initial lifting force is substantially augmented.

A still further object of the invention is to provide a vehicle lift which is simple in its construction and reliable in operation.

A still further object of the invention is to provide a vehicle lift which incorporates a special safety feature so that there is no likelihood of the lift accidentally dropping.

Another object of the invention is to provide a vehicle lift which generally is an improvement over vehicle lifts heretofore known.

Other objects together with the foregoing are attained in the embodiment of the invention described in the accompanying description and illustrated in the accompanying drawings, in which:

FIGURE 7 is a side elevation of the vehicle lift in its lowermost or most closely approached position;

FIGURE 8 is a side elevation of the vehicle lift with the parts in an intermediate lifted position; and FIGURE 9 is a side elevation of the vehicle lift with the parts close to the maximum lifted position.

Figure 1:
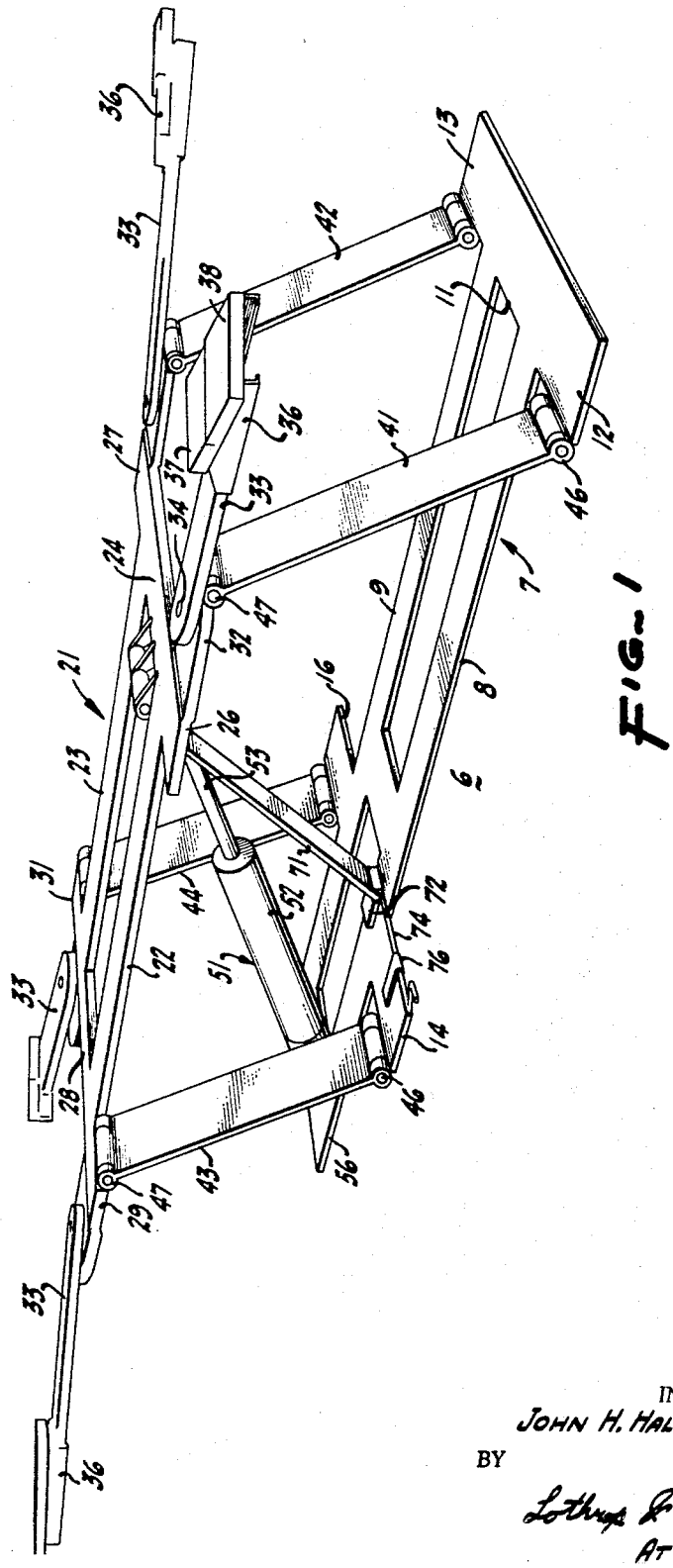
FIGURE 1 is a perspective view of the vehicle lift of the invention in lifted postiion.
Figure 2:
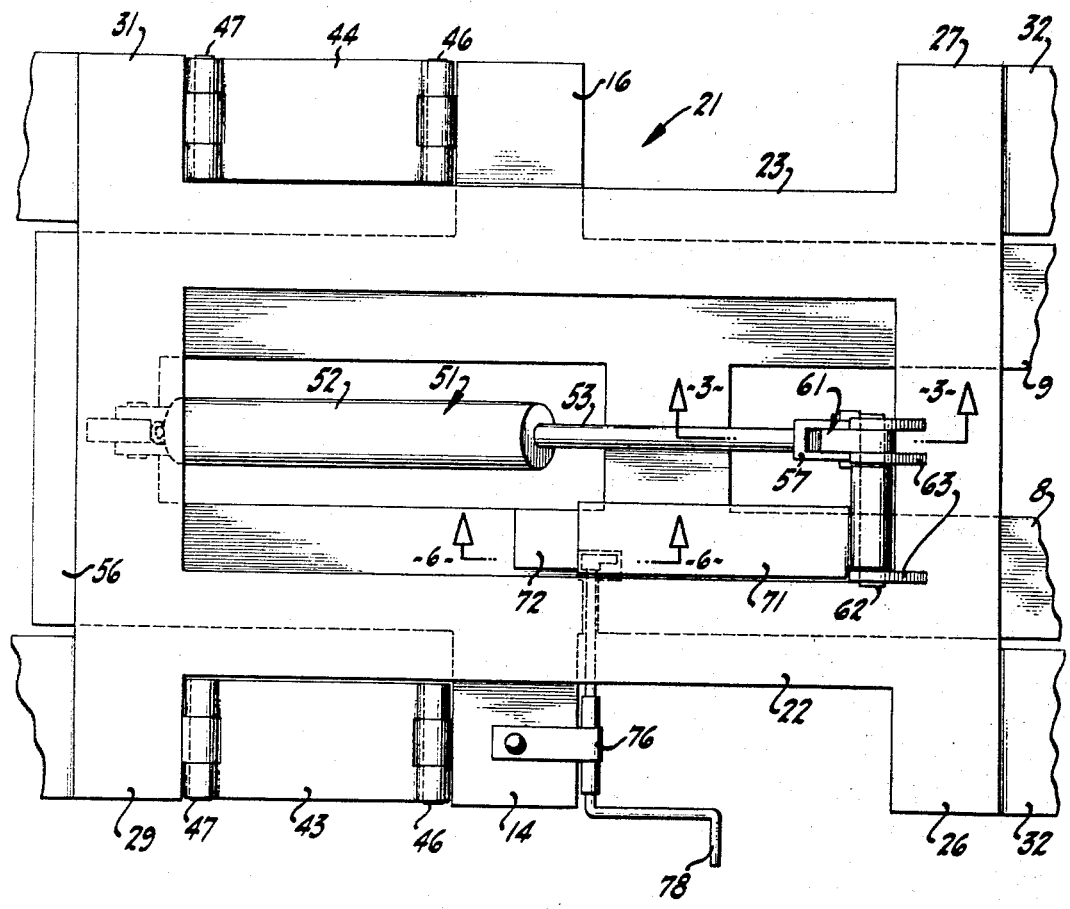
FIGURE 2 is a plan of a portion of the structure shown in FIGURE 1 drawn to an enlarged scale and with portions omitted to reduce the size of the figure.
Figure 6:
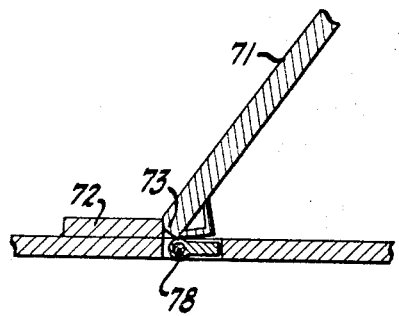
FIGURE 6 is a detail of a safety mechanism, the plane of which is indicated by the line 6–6 of FIGURE 2.

While the vehicle lift can be incorporated in various capacities and in various ways and with different amounts of lift and with varying dimensions, it has successfully been incorporated as disclosed herein. The illustrated design is primarily for use in lifting passenger cars and pick-up trucks as currently manufactured. This category includes vehicles of American and foreign manufacture and having widely disparate weights, contours and dimensions. The principles disclosed can be employed for lifting trucks and heavy vehicles upon an increase in the dimensions and the strength of the parts. The range of motion can likewise be changed by varying some of the dimensions and parts.

In the customary case, the device is installed on the ground or preferably on a hard floor 6 without the necessity of providing any pit, bore or excavation. Resting immediately on the floor 6 is a base, generally designated 7, and made up of a number of plate-like elements to provide a relatively flat support having longitudinal members 8 and 9. There is a cross member 11 at one end of the base to provide extensions 12 and 13, and adjacent the other end of the base there are extensions 14 and 16.

Designed to approach and recede from or to rise and fall relative to the base 7 is a lift frame, generally designated 21, likewise made up of various plate-like members. These afford a pair of longitudinally extending rails 22 and 23 joined by a cross member 24 at one end to provide extensions 26 and 27. Similarly, the rails are joined at the other end by a cross member 28 to provide extensions 29 and 31. Each of the extensions 26 and 27 and each of the extensions 29 and 31 is provided with one of a number of plates 32. Each plate acts as a support for an associated one of four swing arms 33 connected to its plate 32 by a pivot 34 for horizontally swinging motion. Each of the four swing arms 33 has a slide 36 movable along the arm and supporting a pair of tip-ups 37 and 38. These are shown in flat position, but can be individually pivoted about horizontal axes into vertical attitudes for engagement with appropriate vehicle parts. The described structures provided at all four corners of the lift frame 21 can be manipulated by appropriate swinging motion of the arms 33 and by sliding motion of the slides 36 and by use of either one or both of the tip-ups 37 and 38 to engage appropriate lift points on the nether portions of a vehicle overlying the base 7.

In particular accordance with the invention, there is a special means provided for interrelating the base 7 and the lift frame 21 for lifting and lowering movement relative to each other or for approaching and receding movement. This special means is in the form of a parallel linkage including four links, one pair of links 41 and 42 being at one end of the structure and the other pair of links 43 and 44 being at the other end of the structure. The links are all parallel and identical. Each of them is connected by a horizontal, transverse hinge pivot 46 at its lower end to the adjacent one of the extensions 12, 13, 14 or 16. Quite similarly, at the upper end each of the links 41 and 42 as well as 43 and 44 is connected by a horizontal, transverse hinge pivot 47 to the adjacent one of the four plates 32. With this arrangement, the axes of the various pivots 46 and 47 are parallel to each other, and since they are equally spaced in a vertical sense as well as in a horizontal sense, they constitute a parallelogram linkage. The lift frame 21 always moves exactly parallel to the base 7 and is constrained in that attitude for movement toward or to approach the base 7 and away from or to recede from the base 7. The vertical component of the movement is accompanied by a horizontal component since the links move in arcuate paths.

Pursuant to the invention, special means are provided for producing the described movement of the lift frame relative to the base. Preferably, a single expansible chamber mechanism, generally designated 51, is provided for this purpose. Conveniently this is a hydraulically driven structure and includes a cylinder 52 containing a piston (not shown) connected to a piston rod 53 or plunger movable to and fro or into and out of the cylinder 52 so as to provide a form of hydraulic ram or jack. One end of the cylinder 52 is engaged wtih a hinge pin 54 affording relative pivotal movement about a horizontal, transverse axis 55 between the expansible chamber mechanism 51 and the base 7. The hinge pin 54 is mounted on a cross plate 56 located at one end of the side members 8 and 9.

The piston rod 53 is not directly connected to the lift frame 21. Rather, the piston rod 53 is provided (see FIGURES 3, 4 and 5) with a clevis 57 embracing a first pivot pin 58, extending horizontally and transversely with its axis 59 parallel to the axes of the hinge pivots 46. The first pivot pin 58 passes through a cam lever 61. Also passing through the cam lever is a second pivot pin 62 parallel to the pin 58 and having an axis 60. At its ends the pin 62 is mounted in the arms of a bracket 63 secured to the cross member 24 of the lift frame 21. The cam lever 61 is contoured in the vicinity of the pivot pin 58 to provide an arcuate cam surface 64. In one position of the parts the cam surface 64 is designed to ride on or to abut a specially provided cooperating surface 66 on a portion of the base 7 serving as a bearing plate. This is located about midway between the sides of the lift frame and about midway of the length of the lift frame. The cam lever 61 is also especially shaped to provide an abutting surface 67 in one position of the parts designed to move against and to contact an abutment 68 constituted by a vertically extending, transverse surface of the cross member 24 of the lift frame 21.

Figure 3:
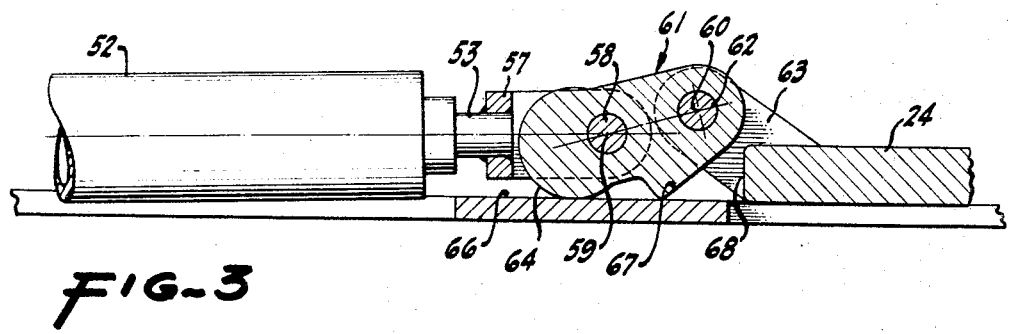
FIGURE 3 is a cross section, the plane of which is indicated by the line 3–3 of FIGURE 2, the parts being in their lowermost or maximum approached position.

In the operation of this structure and starting, as shown in FIGURES 3 and 7, with the parts in their most closely approached or lowermost position, hydraulic fluid under pressure is supplied to the cylinder 52 by any appropriate means (not shown) such as a valved pump under the control of the operator. The fluid under pressure within the cylinder 52 tends to expel the piston rod 53. In this position of the parts (FIGURE 7) the axis 55 of the hinge pin 54 and the axis 60 of the pivot pin 62 are both disposed quite low, but due to the necessary size and arrangement of the parts are located in a plane close to but above the horizontal plane containing the axes of the hinge pivots 46 and containing the axes of the hinge pivots 47. Under these circumstances and without the special cam lever 61, the lift frame 21 would not rise.

Figure 4:
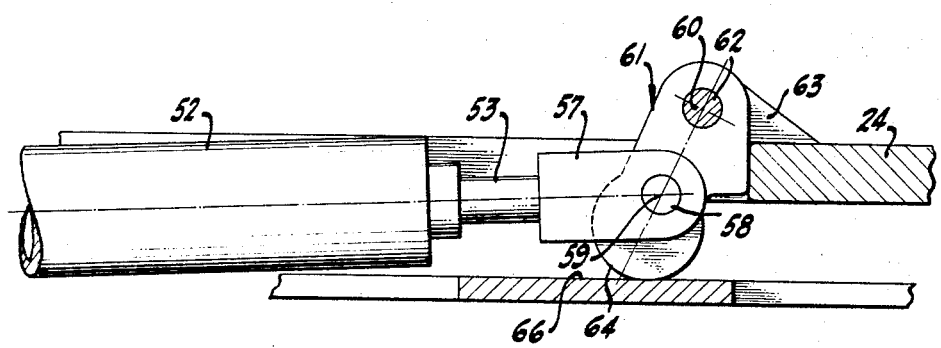
FIGURE 4 is a view similar to FIGURE 3 but showing the parts in an initially raised position.
Figure 5:
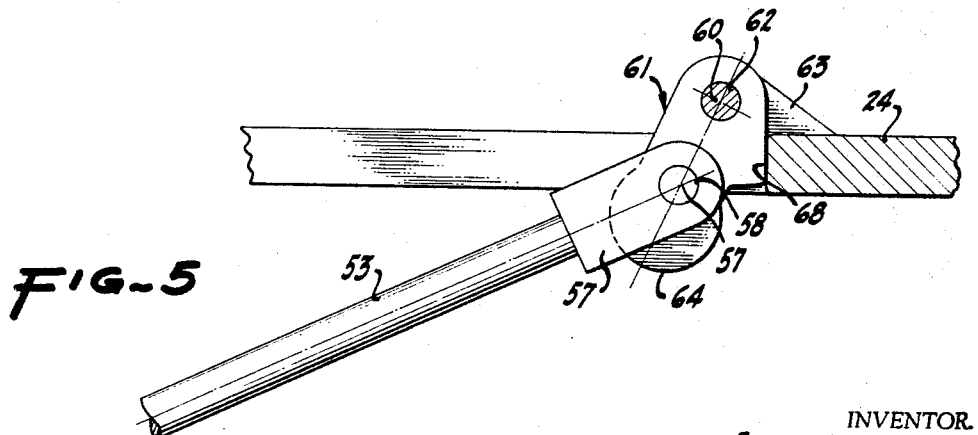
FIGURE 5 is a view similar to FIGURES 3 and 4 but showing the parts in an intermediate raised position.

The axis 59 of the first pivot pin 58 is below a plane containing the axis 55 of the hinge pin 54 and the axis 60 of the second pivot pin 62. Although the axes described can be roughly or approximately considered in the lowermost position as being in the same horizontal plane, this is not strictly true of all of them because the axis 59 is always lower than the axis of the second pivot pin 62. A straight line mechanism is never formed by the hydraulically expansible chamber and the cam lever 61. That is, when the lift frame 21 rests on the base 7 as a stop, and the cam surface 64 is against the cooperating surface 66, the bracket 63 disposes the axis 60 of the second pivot pin 62 above a plane containing the axis 59 of the first pivot pin 58 and the axis 55 of the hinge pin 54. Thus when there is pressure exerted to expel the piston rod 53, the action is first to rotate the cam lever 61 in a counterclockwise direction as seen in FIGURES 3, 4 and 5 and to urge the cam surface 64 against the cooperating surface 66 and thus to raise or in effect to wedge the lift frame 21 through a small initial distance with a relatively large mechanical advantage.

This initial camming or lifting operation occurs only in the lower positions of the lift frame adjacent its position of closest approach to the base. This is because when the cam lever 61 has been rotated in a counterclockwise direction sufficiently to lift the various axes of the hinge pivots 47 above the axes of the hinge pivots 46, substantially as shown in FIGURES 4 and 8, the abutting surface 67 contacts the abutment 68, thus arresting counterclockwise rotation and camming action of the cam lever 61.

At that time the cam lever 61 and the lift frame 21 are in effect one structure. The hydraulically expansible mechanism is then at a sufficient angle so that the continued exertion of force therein further expels the piston rod 53. The lift frame 21 is thus raised always parallel with the base 7 and in a rising path governed by clockwise (in FIGURES 7, 8 and 9) rotation of the various links 41, 42, 43 and 44. The lifting motion continues to any desired extent, usually to a point somewhat short of that at which the links 41, 42, 43 and 44 are vertical. A vehicle on the lift frame is thus lifted any desired distance from the ground, always remaining parallel to itself but also being translated in a longitudinal direction due to the arcuate movement of the links.

To make sure that any failure of hydraulic pressure or inadvertent actuation of the lowering valve does not cause difficulty, a safety device is provided. Connected on the second pivot pin 62 in the bracket 63 is a strut 71 or safety leg free at its lower end. As the lift frame rises and advances, the strut 71 also rises and advances at its pivoted end. At its lower end, due to its weight, the strut drags over a stop plate 72 secured to the base 7. At about the maximum desired lifting elevation, the strut 71 falls by gravity just behind the stop plate 72. The contoured end 73 of the strut lodges in position behind the stop plate 72 and against the base 7. If then the piston rod 53 tends to move into the cylinder for any reason, this motion is restricted since the strut 71 cannot move back past the stop plate 72 and the lift frame is held in its upper position.

When the lift frame is to be lowered, the user first further expels the piston rod 53, thus raising the lift frame 21 slightly more. When this occurs, the lower, contoured end 73 of the strut 71 is free. It is then lifted by rotation of a control rod 74. This is secured in journal brackets 76 on the base 7 and is operated by a crank handle 78. Rotation by the user of the crank handle 78 also rotates a radius arm 79 on the rod 74 which abuts and lifts the contoured end 73 of the strut upwardly and rearwardly to lie on the stop plate 72. In this position of the strut, retracting movement of the piston rod 53 into the cylinder 52 lowers the lift frame 21 by a parallel motion back to its initial position substantially as shown in FIGURES 3 and 7. The strut slides along the top of the stop plate 72.

I have therefore provided a device which does not require any extensive site preparation for installation. Although it is preferred to bolt the base 7 to the floor 6, yet the device can be unfastened and moved about from time to time and from place to place if desired. The mechanism provides extra mechanical advantage to move the lift frame from its position almost coincident with the base up to an elevated position, the large mechanical advantage being utilized in the initial lifting movement where it is most needed. Thereafter a more rapid lifting with less mechanical advantage takes place. A safety leg prevents unwarranted lowering of the lift frame. A low, simple, effective and safe device has been provided.

What is claimed is:

1. A vehicle lift comprising a base including a bearing plate, a lift frame, vehicle engaging members on said lift frame, a plurality of parallel links, means for pivoting said links to said base and to said lift frame, an expansible chamber mechanism, means for pivoting said expansible chamber mechanism to said base, a cam lever, means for pivoting said expansible chamber mechanism to said cam lever, means for pivoting said cam lever to said lift frame, means on said lift frame forming an abutment for said cam lever, and means on said cam lever adapted to operate against said bearing plate.

2. A vehicle lift for use on a planar support comprising a plate base adapted to rest on said support; a first pair of horizontal, aligned pivots adjacent one end of said base; a second pair of parallel, aligned pivots adjacent the other end of said base; a plate lift frame; a third pair of parallel, aligned pivots adjacent one end of said lift frame; a fourth pair of parallel, aligned pivots adjacent the other end of said lift frame; a first pair of flat links connected to said first and second pair of pivots; a second pair of similar, flat links connected to said third and fourth pair of pivots; a cylinder; means for pivoting one end of said cylinder to said base for rotation about an axis parallel to said pivots; a piston rod reciprocable in and extending from said cylinder; a cam lever; means for pivoting said cam lever intermediate the ends thereof on said piston rod about an axis parallel to said pivots; means for pivoting one end of said cam lever on said lift frame about an axis parallel to said pivots; cam means at the other end of said cam lever adapted in one pivoted position of said cam lever to engage a portion of said base; stop means on said cam lever adapted in another pivoted position thereof to abut a portion of said lift frame; and means for operating said piston rod between a lower position in which said first, second, third and fourth pairs of pivots are substantially in the same plane and said cam means at the other end of said cam lever engages said portion of said base and an upper position in which said second and fourth pairs of pivots are spaced from said first and third pairs of pivots and said stop means on said cam lever abuts said portion of said lift frame.

References Cited

FOREIGN PATENTS

| | | |
|---|---|---|
| 691,037 | 3/1930 | France. |
| 751,423 | 5/1932 | France. |
| 600,595 | 7/1934 | Germany. |
| 926,089 | 4/1955 | Germany. |
| 1,035,878 | 6/1953 | Germany. |
| 980,544 | 1/1965 | Great Britain. |

EVON C. BLUNK, *Primary Examiner.*

H. C. HORNSBY, *Assistant Examiner.*